(12) United States Patent
Haddow et al.

(10) Patent No.: US 11,509,552 B2
(45) Date of Patent: *Nov. 22, 2022

(54) APPLICATION AWARE DEVICE MONITORING CORRELATION AND VISUALIZATION

(71) Applicant: Cisco Technology, Inc., San Jose, CA (US)

(72) Inventors: Thomas Haddow, San Francisco, CA (US); Ricardo V. Oliveira, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/066,322

(22) Filed: Oct. 8, 2020

(65) Prior Publication Data

US 2021/0126844 A1 Apr. 29, 2021

Related U.S. Application Data

(63) Continuation of application No. 16/661,766, filed on Oct. 23, 2019, now Pat. No. 10,848,402.

(Continued)

(51) Int. Cl.
*H04L 43/045* (2022.01)
*H04L 41/14* (2022.01)
(Continued)

(52) U.S. Cl.
CPC ........ *H04L 43/045* (2013.01); *H04L 41/0253* (2013.01); *H04L 41/12* (2013.01); *H04L 41/14* (2013.01)

(58) Field of Classification Search
CPC ... H04L 43/045; H04L 41/0253; H04L 41/12; H04L 41/14
See application file for complete search history.

(56) References Cited

U.S. PATENT DOCUMENTS

| 5,655,081 A | 8/1997 | Bonnell |
| 5,881,237 A | 3/1999 | Schwaller |

(Continued)

FOREIGN PATENT DOCUMENTS

| CN | 100388695 | 11/2006 |
| EP | 2222025 | 8/2010 |

(Continued)

OTHER PUBLICATIONS

Author Unknown, BGPlay @ Route Views, Apr. 14, 2015 retrieved from https://web.archive.org/web/20150414123115/http://bgplay.routeviews.org/main.html.

(Continued)

*Primary Examiner* — Benjamin M Thieu
(74) *Attorney, Agent, or Firm* — Behmke Innovation Group LLC; James M. Behmke; Jonathon P. Western

(57) ABSTRACT

Techniques for application aware device monitoring correlation and visualization are disclosed. In some embodiments, a system, a process, and/or a computer program product for providing application aware device monitoring includes collecting network layer information from one or more agents utilizing a plurality of tests; collecting device layer information from the one or more agents deployed to monitor a plurality of devices in a network computing environment; correlating the network layer information and the device layer information; and generating a graphical visualization based on the correlated network layer and (Continued)

device layer information (e.g., an alert, report, and/or a graphical visualization can be provided based on the correlated network layer and device layer information to facilitate root cause detection for application performance issues).

20 Claims, 11 Drawing Sheets

Related U.S. Application Data

(60) Provisional application No. 62/750,195, filed on Oct. 24, 2018.

(51) Int. Cl.
*H04L 41/12* (2022.01)
*H04L 41/0253* (2022.01)

(56) References Cited

U.S. PATENT DOCUMENTS

| | | |
|---|---|---|
| 5,940,376 A | 8/1999 | Yanacek |
| 6,397,359 B1 | 5/2002 | Chandra |
| 6,611,955 B1 | 8/2003 | Logean |
| 6,625,648 B1 | 9/2003 | Schwaller |
| 6,744,739 B2 | 6/2004 | Martin |
| 6,892,227 B1 | 5/2005 | Elwell |
| 6,990,101 B1 | 1/2006 | Chow |
| 6,993,686 B1 | 1/2006 | Groenendaal |
| 7,209,963 B2 | 4/2007 | Burton |
| 7,231,555 B2 | 6/2007 | Barnard |
| 7,240,325 B2 | 7/2007 | Keller |
| 7,299,277 B1 | 11/2007 | Moran |
| 7,423,979 B2 | 9/2008 | Martin |
| 7,487,240 B2 | 2/2009 | Proulx |
| 7,529,192 B2 | 5/2009 | Labovitz |
| 7,549,309 B2 | 6/2009 | Beringer |
| 7,616,579 B2 | 11/2009 | Pittelli |
| 7,636,305 B1 | 12/2009 | Taylor |
| 7,660,290 B2 | 2/2010 | Nagami |
| 7,698,396 B2 | 4/2010 | Aoyagi |
| 7,804,781 B2 | 9/2010 | Xu |
| 7,822,837 B1 | 10/2010 | Urban |
| 7,860,016 B1 | 12/2010 | Vijendra |
| 7,894,461 B2 | 2/2011 | Pei |
| 7,945,658 B1 | 5/2011 | Nucci |
| 7,975,045 B2 | 7/2011 | Underwood |
| 7,990,892 B2 | 8/2011 | Boucadair |
| 8,015,139 B2 | 9/2011 | Bahl |
| 8,032,646 B2 | 10/2011 | Nag |
| 8,130,767 B2 | 3/2012 | Aitken |
| 8,161,152 B2 | 4/2012 | Ogielski |
| 8,170,552 B2 | 5/2012 | Patel |
| 8,185,619 B1 | 5/2012 | Maiocco |
| 8,208,377 B2 | 6/2012 | Subramanian |
| 8,214,876 B2 | 7/2012 | Vaidyanathan |
| 8,228,815 B2 | 7/2012 | Keromytis |
| 8,254,273 B2 | 8/2012 | Kaminsky |
| 8,325,720 B2 | 12/2012 | Gao |
| 8,438,427 B2 | 5/2013 | Beck |
| 8,458,301 B1 | 6/2013 | Andrus |
| 8,484,374 B2 | 7/2013 | Zisapel |
| 8,490,055 B2 | 7/2013 | Basak |
| 8,521,904 B1 | 8/2013 | Pei |
| 8,542,612 B1 | 9/2013 | Uttaro |
| 8,549,124 B2 | 10/2013 | Duggan |
| 8,549,405 B2 | 10/2013 | Bugenhagen |
| 8,572,281 B1 | 10/2013 | Jesuraj |
| 8,675,672 B1 | 3/2014 | Bao |
| 8,751,619 B2 | 6/2014 | Tychon |
| 8,971,323 B2 | 3/2015 | Mithyantha |
| 9,014,012 B2 | 4/2015 | Jeyachandran |
| 9,277,044 B2 | 3/2016 | Kahn |
| 9,411,787 B1 | 8/2016 | Lad |
| 9,455,890 B2 | 9/2016 | Lad |
| 9,729,414 B1 | 8/2017 | Oliveira |
| 9,781,008 B1 | 10/2017 | Notari |
| 9,800,478 B2 | 10/2017 | Lad |
| 9,886,445 B1 | 2/2018 | Gupta |
| 9,939,289 B1 | 4/2018 | Clauss |
| 9,985,858 B2 | 5/2018 | Lad |
| 10,037,617 B2 | 7/2018 | Ebtekar |
| 10,042,958 B2 | 8/2018 | Bekas |
| 10,230,603 B2 | 3/2019 | Lad |
| 2002/0031087 A1 | 3/2002 | Gotoh |
| 2002/0120727 A1 | 8/2002 | Curley |
| 2002/0141400 A1 | 10/2002 | DeMartino |
| 2002/0198985 A1 | 12/2002 | Fraenkel |
| 2002/0199016 A1 | 12/2002 | Freedman |
| 2003/0056140 A1 | 3/2003 | Taylor |
| 2003/0174650 A1 | 9/2003 | Shankar |
| 2003/0236844 A1 | 12/2003 | Kaler |
| 2004/0046785 A1 | 3/2004 | Keller |
| 2004/0126840 A1 | 7/2004 | Cheng |
| 2004/0221296 A1 | 11/2004 | Ogielski |
| 2005/0036487 A1 | 2/2005 | Srikrishna |
| 2005/0114500 A1 | 5/2005 | Monk |
| 2005/0198269 A1 | 9/2005 | Champagne |
| 2005/0222815 A1 | 10/2005 | Tolly |
| 2005/0243729 A1 | 11/2005 | Jorgenson |
| 2006/0023638 A1 | 2/2006 | Monaco |
| 2006/0074946 A1 | 4/2006 | Pham |
| 2006/0098586 A1 | 5/2006 | Farrell |
| 2006/0291446 A1 | 12/2006 | Caldwell |
| 2007/0043861 A1 | 2/2007 | Baron |
| 2007/0162595 A1 | 7/2007 | Samprathi |
| 2007/0250902 A1 | 10/2007 | Vaidyanathan |
| 2008/0049777 A1 | 2/2008 | Morrill |
| 2008/0089347 A1 | 4/2008 | Phillipi |
| 2008/0155093 A1 | 6/2008 | Dharmistan |
| 2008/0222068 A1 | 9/2008 | Bahl |
| 2008/0222287 A1 | 9/2008 | Bahl |
| 2008/0263188 A1 | 10/2008 | Awduche |
| 2009/0055522 A1 | 2/2009 | Shen |
| 2009/0161556 A1 | 6/2009 | Qian |
| 2009/0204795 A1 | 8/2009 | Nasuto |
| 2009/0276771 A1 | 11/2009 | Nickolov |
| 2010/0002578 A1 | 1/2010 | Fiorone |
| 2010/0080129 A1 | 4/2010 | Strahan |
| 2010/0100627 A1 | 4/2010 | Evans |
| 2010/0118714 A1 | 5/2010 | Labovitz |
| 2010/0132039 A1 | 5/2010 | Ji |
| 2011/0145434 A1 | 6/2011 | Ringen |
| 2011/0170402 A1 | 7/2011 | Kikuchi |
| 2011/0286418 A1 | 11/2011 | Liu |
| 2012/0017165 A1 | 1/2012 | Gardner |
| 2012/0151041 A1 | 6/2012 | Gerber |
| 2012/0191826 A1 | 7/2012 | Gotesdyner |
| 2012/0207161 A1 | 8/2012 | Uppalli |
| 2012/0239799 A1 | 9/2012 | Wang |
| 2013/0275854 A1 | 10/2013 | Lim |
| 2013/0283148 A1 | 10/2013 | Lim |
| 2013/0311832 A1 | 11/2013 | Lad |
| 2014/0029443 A1 | 1/2014 | Bhavanam |
| 2014/0181292 A1 | 6/2014 | Venkataswami |
| 2014/0245163 A1 | 8/2014 | Mubarek |
| 2014/0280917 A1 | 9/2014 | Lad |
| 2014/0282027 A1 | 9/2014 | Gao |
| 2014/0304407 A1 | 10/2014 | Moon |
| 2014/0344926 A1 | 11/2014 | Cunningham |
| 2014/0351564 A1 | 11/2014 | Bekas |
| 2015/0103672 A1 | 4/2015 | Stuart |
| 2015/0156077 A1 | 6/2015 | Gao |
| 2015/0370445 A1 | 12/2015 | Wang |
| 2016/0080244 A1 | 3/2016 | Retana |
| 2016/0197818 A1 | 7/2016 | Stuart |
| 2017/0026262 A1 | 1/2017 | Lad |
| 2017/0134957 A1 | 5/2017 | Gupta |
| 2017/0249781 A1 | 8/2017 | Wald |
| 2017/0353243 A1 | 12/2017 | Brueckheimer |
| 2018/0121032 A1 | 5/2018 | Naous |
| 2018/0189320 A1 | 7/2018 | Jin |
| 2018/0278330 A1 | 9/2018 | Brueckheimer |
| 2018/0322219 A1 | 11/2018 | Bekas |

(56) References Cited

U.S. PATENT DOCUMENTS

| | | |
|---|---|---|
| 2018/0337842 A1 | 11/2018 | Appel |
| 2018/0375953 A1 | 12/2018 | Casassa Mont |
| 2019/0065563 A1 | 2/2019 | Petculescu |
| 2019/0149419 A1 | 5/2019 | Saeki |
| 2020/0044940 A1 | 2/2020 | Thomasson |

FOREIGN PATENT DOCUMENTS

| | | | |
|---|---|---|---|
| EP | 3082296 A1 * | 10/2016 | ........... H04L 41/145 |
| EP | 1402355 | 8/2018 | |
| WO | 2007038953 | 4/2007 | |

OTHER PUBLICATIONS

Author Unknown, Bgplay.js, What is BGPlay.js? Printed on Apr. 7, 2015.

Author Unknown, Ripe Network Coordination Centre, printed on Apr. 7, 2015.

Author Unknown, Route View 6447, Route Views Project Page, University of Oregon Route Views Project, Jan. 27, 2005.

Author Unknown, Routing Information Service (RIS), Oct. 7, 2013.

Blunk et al., Multi-Threaded Routing Toolkit (MRT) Routing Information Export Format, Oct. 2011.

Lougheed et al., A Border Gateway Protocol (BGP), Jun. 1989.

McCloghrie et al., The Interfaces Group MIB Using SMIv2, Network Working Group, Nov. 1997.

Rekhter et al., A Border Gateway Protocol 4 (BGP-4), Jan. 2006.

Vazquez et al., Internet Topology at the Router and Autonomous System Level, 2002.

Wikipedia, Floyd-Warshall Algorithm, Oct. 24, 2018.

Hong et al., An Online Monitoring Solution for Complex Distributed Systems Based on Hierarchical Monitoring Agents, Knolwdge and Systems Engineering, vol. 1, Advances in Intelligent Systems and Computing 244, pp. 187-198, 2014.

Tonn et al., ASGARD—A Graphical Monitoring Tool for Distributed Agent Infrastructures, Advances in PAAMS, AISC 70, pp. 163-173, 2010.

* cited by examiner

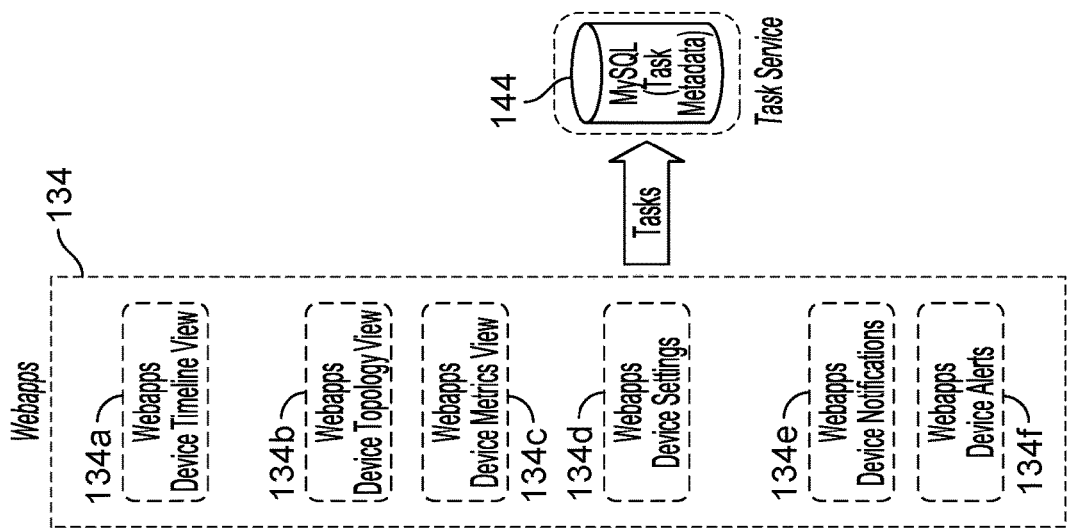

| Devices | Interfaces (csc) | Diagram (csc) |
|---|---|---|

Aggregate metrics for device — 702

| | | Show only device interfaces matching all / any |
|---|---|---|
| Name | csc | [Search interfaces 🔍] |
| Type | Router | |
| Vendor | Cisco Systems | INPUT    OUTPUT |
| Description | Cisco IOS Software, ISR Software (X86_64_LINUX_IOSD-UNIVERSALK9-M), Version 15.6... (Show more) | Gi0/0/1 (te-sfo-lab-as2 Fa 0/4)    Gi0/0/0 ⇨ |
| Availability | 100% | Gi0/0/2 (te-sfo-lab-ds1 Gi0/25)    Gi0/0/2 (te-sfo-lab-ds1 Gi0/25) ⇨ [▓▓▓] Discards > 0 % (1 interface) ▾ |
| Throughput | 99.2 Mbps Input  98.5 Mbps Output | Gi0/0/3 (te-sfo-lab-ds2 Gi0/25)    Gi0/0/0 ⇨ |
| Discards | 0 pps Input  58.4 pps Output | Vi3 ⇨    Gi0/0/1 (te-sfo-lab-as2 Fa 0/4) ⇨ |
| Errors | 0 pps Input  0 pps Output | Gi0 ⇨    Vi3 ⇨ |
| | | | Gi0 ⇨    Gi0/0/3 (te-sfo-lab-ds2 Gi0/25) ⇨ |

FIG. 7

APPLICATION AWARE DEVICE MONITORING CORRELATION AND VISUALIZATION

CROSS REFERENCE TO OTHER APPLICATIONS

This application is a continuation of U.S. patent application Ser. No. 16/661,766 entitled APPLICATION AWARE DEVICE MONITORING CORRELATION AND VISUALIZATION filed Oct. 23, 2019, which claims priority to U.S. Provisional Patent Application No. 62/750,195 entitled APPLICATION AWARE DEVICE MONITORING CORRELATION AND VISUALIZATION filed Oct. 24, 2018, both of which are incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

BRIEF DESCRIPTION OF THE DRAWINGS

Various embodiments of the invention are disclosed in the following detailed description and the accompanying drawings.

FIG. 7 illustrates a Diagram view in accordance with some embodiments.

DETAILED DESCRIPTION

Figure 1A:
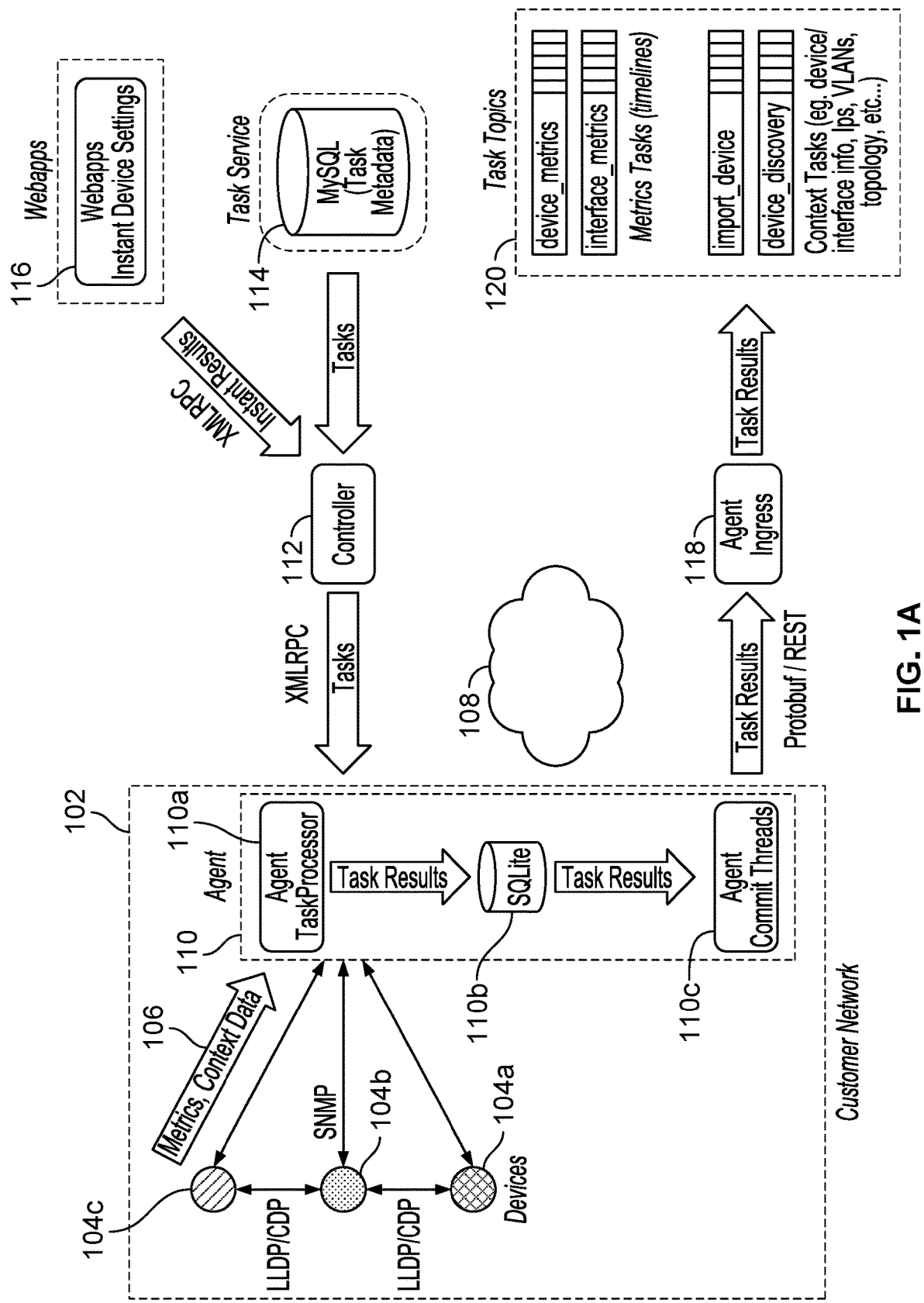
FIGS. 1A and 1B illustrate an architecture for implementing application aware device monitoring in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Overview of Application Aware Device Monitoring

End-to-end application metrics derived from active network testing can provide valuable insight into user-perceivable application performance. However, such insights generally can (at best) provide information about the problems that are occurring and provide some guidance as to where such problems may exist. Direct device monitoring can provide valuable information on general network performance but provides little guidance on the impact that network health may have on application performance. As such, existing monitoring methodologies typically require operators to manually attempt to correlate application performance reports with device performance data, which is a reactive approach that increases the time taken to resolve problems and is also prone to error.

Thus, new and improved monitoring techniques for application performance are needed. Accordingly, techniques for application aware device monitoring are disclosed. For example, by automatically contextualizing application performance issues with device information, the disclosed techniques for application aware device monitoring can improve the ability of a user (e.g., network/system administrator(s) (admin(s))) to more effectively and efficiently diagnose the underlying cause of application performance concerns to issues in specific network devices and ports. Similarly, the disclosed techniques for application aware device monitoring can enable the user to understand how health issues in network infrastructure devices may impact specific network applications.

In some embodiments, the disclosed techniques for application aware device monitoring include enabling a user to gather information about the devices within their computing/network/application environment(s) (e.g., generally referred to herein as a network computing environment) and selectively monitor devices and interfaces of interest. For example, monitored devices can be periodically queried (e.g., every 5 minutes to 24 hours or some other periodic interval) to extract both interface performance metrics and contextual device and port information to enable correlating these performance metrics (e.g., interface performance metrics and contextual device and port information) with end-to-end application performance, such as further described below.

Example Architecture for Application Aware Device Monitoring

Figure 1B:
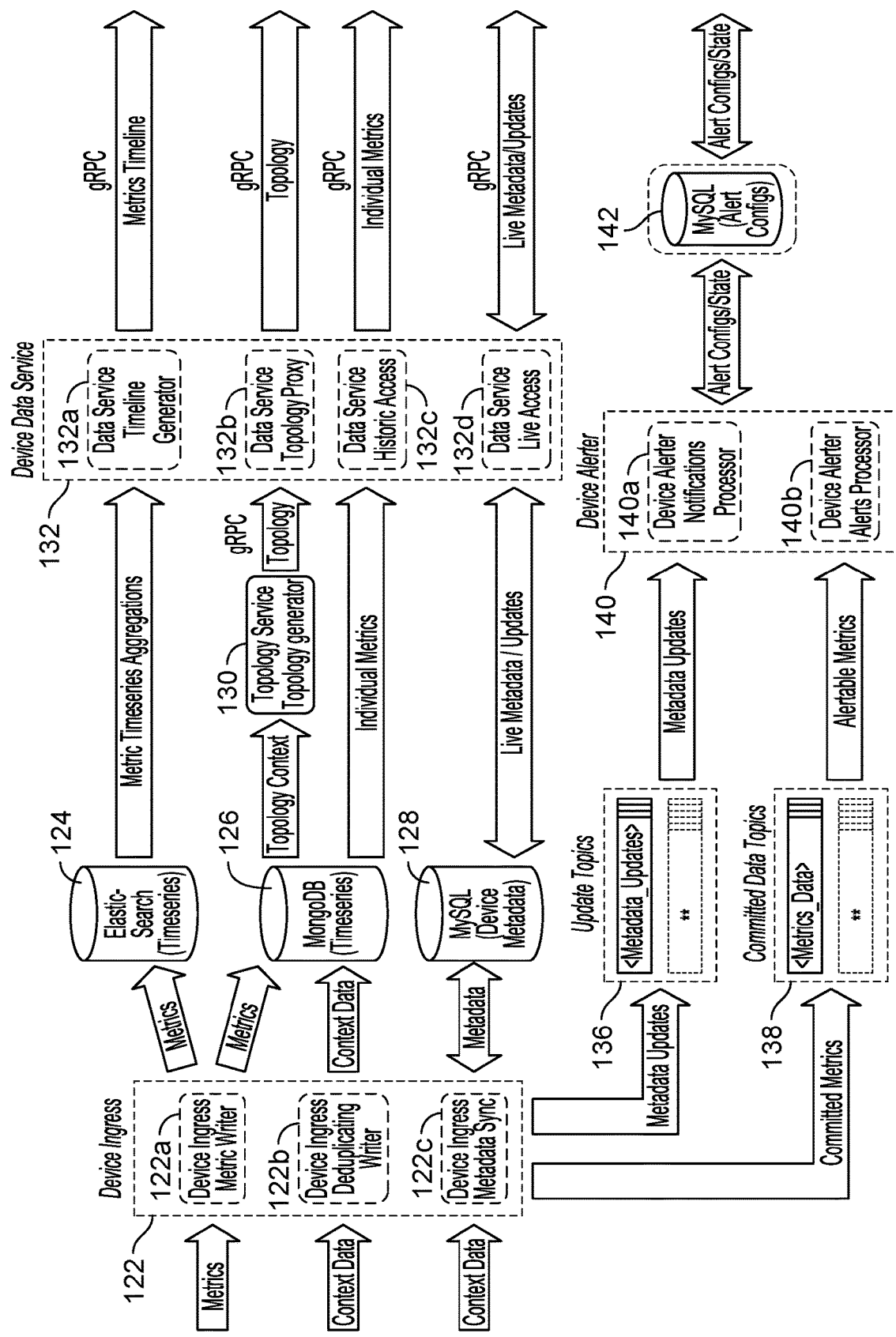

FIGS. 1A and 1B illustrate an architecture for implementing application aware device monitoring in accordance with some embodiments. In an example implementation, the disclosed techniques for monitoring and correlating network layer and device layer information include one or more agents (e.g., enterprise agents that can execute various network layer tests and/or communicate with various devices on the network to collect network layer and device layer information). For example, at least one of the enterprise agents includes the disclosed device layer monitoring and correlation feature enabled and collects interface metrics and device data from the monitored network devices.

Referring to FIG. 1A, a customer network 102 includes a plurality of devices 104a-c in network communication with an agent 110 (e.g., an Enterprise Agent that has the disclosed device layer monitoring and correlation feature enabled and collects interface metrics and device data from the monitored network devices 104a-c as further described below). In an example implementation, the agents perform periodic Simple Network Management Protocol (SNMP) polling (e.g., every 5 minutes to 24 hours or some other periodic interval) of IETF standard IF-Management Information Base (MIB) (e.g., as specified in IETF RFC 2233, which is available at https://www.ietforg/rfc/rfc2233.txt) and Cisco Discovery Protocol (CDP) and Link Layer Discovery Protocol (LLDP) MIB to collect the device metrics and topology information for the customer network as shown at 106. In this example, the Device Layer feature utilizes the monitoring enterprise agents to have access to the SNMP management Virtual Local Area Network (VLAN) and SNMP Read Only (RO) credentials (e.g., either SNMP v2c or SNMP v3 versions) of the network devices.

In this example implementation, initial configuration is essentially zero-touch, and the device discovery can be automated using scheduled discovery where the monitoring enterprise agent periodically scans a target host, IP address, or subnet range and discovers network devices to be monitored (e.g., every 5 minutes to 24 hours or some other periodic interval). Alternatively, the network devices can be added by specifying an IP address or hostname target using a manual discovery process. Users can then choose specific interfaces within the discovered devices to periodically collect health metrics and network device data.

SNMP is used as a data source in this example implementation as it is still the most widely used standard to gather network device metrics. However, the Device Layer feature can be implemented as open and extensible to support other data collection mechanisms (e.g., using existing or later developed open and/or proprietary protocols) to facilitate performing the disclosed techniques at the device layer.

In this example implementation, agent 110 includes an agent Task Processor (TaskProcessor) component 110a for performing tasks received from an Agent Controller 112. As shown, the Agent Controller can be in communication with the agents via a network (e.g., the Internet) as shown at 108. The agents also include a data store (e.g., SQLite or another data store component) component 110b for storing task results as shown. The task results can then be returned by the agent using an agent commit thread component 110c as shown and as further described below.

As also shown in FIG. 1A, Webapps 116 can be used to send tasks to the deployed agents via a network, such as the Internet. In an example implementation, the Instant Tasks are sent via an eXtensible Markup Language-Remote Procedure Call (XML-RPC) as shown (e.g., or other protocol(s) can be similarly implemented) to send configured Instant Tasks to the Agent Controller, which then sends the tasks to the agents using XML-RPC (e.g., or other protocol(s) can be similarly implemented) as shown. Similarly, a Task Service 114 can also be optionally provided for storing Task Metadata in a data store, such as My SQL as shown (e.g., or another data store can be similarly implemented), which can be used to similarly send tasks to the Agent Controller for then sending to the agents via XML-RPC (e.g., or other protocol(s) can be similarly implemented) as also shown.

As discussed above, the task results are provided by the agents to an Agent Ingress component 118 using a communication interface (e.g., using a Protocol Buffer (Protobuf) implemented REST Application Programming Interface (API) or another communication interface mechanism can be implemented) and then provided by the Agent Ingress component to a Task Topics component 120 as shown in FIG. 1A. In this example, the Task Topics include device metrics (e.g., device_metrics) and interface metrics (e.g., interface_metrics) shown as Metrics Tasks (timelines), and the Task Topics also include device information (e.g., import_device and device_discovery) shown as Context Tasks (e.g., device/interface info, IPs, VLANs, topology, etc.). The Task Topics 120 shown in FIG. 1A connect to the left-most arrows shown in FIG. 1B, which will now be discussed.

Referring to FIG. 1B (e.g., the left-most arrows in FIG. 1B connect to the Task Topics 120 shown in FIG. 1A as mentioned above), the Metrics and Context Data are provided to a Device Ingress 122. The Device Ingress includes a Metric Writer component 122a that writes the Metrics data in a time series into an Elastic Search data store 124 (e.g., or another type of data store can be implemented) to facilitate Metrics Time Series aggregations and provides to a Device Data Service 132 as shown. The Metric Writer component also writes the Metrics data in a time series into a MongoDB data store 126 (e.g., or another type of data store can be implemented) in which the Topology Content is provided to a Topology Service 130 that includes a Topology Generator (e.g., for generating a network computing environment topology based on the Topology Content) and provided to the Device Data Service as shown. The Device Ingress also includes a Deduplicating writer component 122b that deduplicates the Context data for storing in the MongoDB data store in which the individual metrics are provided to the Device Data Service as shown. The Device Ingress also includes a Metadata Sync component 122c that writes the Device Metadata associated with the Context data into a MySQL data store 128 (e.g., or another type of data store can be implemented) for storage of the Device Metadata in which the Live Metadata/Updates are provided to the Device Data Service as shown.

The Device Data Service includes a Data Service Timeline Generator component 132a that provides a Metrics Timeline (e.g., using an open source RPC framework such as gRPC or other communication interface frameworks can be similarly implemented) to Web Applications 134 (e.g., Webapps), which includes a Device Timeline View component 134a as shown. The Device Data Service also includes a Topology Proxy component 132b that provides a Topology (e.g., using an open source RPC framework such as gRPC or other communication interface frameworks can be similarly implemented) to Web Applications 134 (e.g., Webapps), which includes a Device Topology View component 134b as shown. The Device Data Service also includes a Historic Access component 132c that provides Individual Metrics (e.g., using an open source RPC framework such as gRPC or other communication interface frameworks can be similarly implemented) to Web Applications 134 (e.g., Webapps), which includes a Device Metrics View component 134c as shown. Finally, the Device Data Service also includes a Live Access component 132d that provides Individual Metrics (e.g., using an open source RPC framework such as gRPC or other communication interface frameworks can be similarly implemented) to Web Applications 134 (e.g., Webapps), which includes a Device Settings component 134d as shown.

As also shown in FIG. 1B, Metadata Updates are provided from the Device Ingress to Update Topics 136, and Metadata Updates are provided to a Device Alerter 140 as shown. In addition, Committed Metrics are provided to Committed Data Topics 138, and Alertable Metrics are similarly provided to the Device Alerter. The Device Alerter includes a Notification Processor component 140a and an Alerts Processor component 140b for providing an Alert Configs/State for storing in a MySQL data store 142 (e.g., or another data store can be implemented). The Alert Configs/State is provided to the Webapps for providing device notifications and device alerts using Device Notifications component 134e and Device Alerts component 134f respectively. Finally, the Tasks are provided from the Webapps to a Task Service that stores the associated Task Metadata in a MySQL data store 144 (e.g., or another data store can be implemented).

These functions and components will be further described below with respect to various embodiments and additional figures. As will now be apparent to one of ordinary skill in the art, various other architectures can be similarly implemented for providing application aware device monitoring.

Gathering Device Information

Device Discovery

In some embodiments, given a monitoring agent (e.g., Agent 110 as shown in FIG. 1A, which can be implemented using an Enterprise Agent or an Enterprise Agent cluster) located in a management network, a set of network prefixes and (optionally) a list of credentials (e.g., Simple Network Management Protocol (SNMP) v2c/v3 credentials), periodically scanning the network with unauthenticated "empty" SNMPv3 queries is performed to induce an SNMP response from any reachable compliant device. This response generally provides the device IP address, which can be resolved to a hostname, and the device EngineId, a unique device identifier.

This EngineId can be interpreted to provide more user-meaningful context, such as a vendor (e.g., as mapped from Private Enterprise Numbers) and a more specific identifier type, such as a device name, IP address, and/or MAC address. The device can be presented to the user (e.g., network/system admin) to request specific credentials for the device or the user can supply a list of credentials to try as part of the discovery setup process.

In this example implementation, once a list of credentials and a device address have been obtained/received, iteratively testing these credentials against the device can then be performed. For example, iteratively testing these credentials against the device is performed by generating a query that requests basic device identifying information, such as a user-given device name (sysName), serial number(s), and protocol specific identifier(s) (e.g., MAC addresses, LLDP Chassis ID, and/or CDP Device ID). This query can also include requests for information for classifying the device when presenting it to the user, such as the types of services it supports (e.g., sysServices and/or LLDP capabilities), which can be heuristically mapped into simplified device types (e.g., a Router, a Switch, an Access Point, a Firewall, a Load Balancer, and/or other network device types). To provide further context to the user, additional information can be requested, such as requesting the manufacturer and model name directly and/or via interpreting the sysObjectId field. In the case that a device responds to this request, it is noted by the agent that it is reachable with the given credentials.

Importing Interface Metadata

Once a credential is determined/verified for a given device, the interface metadata is imported for the ports on the device to enable the user to configure for monitoring. For example, interface identifying information (e.g., ifIndex, LLDP/CDP Port ID, and MAC addresses) as well as contextual information for user guidance (e.g., interface name, description, and alias) can be requested and imported (e.g., as shown at 106 in FIG. 1A). At this stage, the IP addresses associated with the device and their respective interface identifiers can also be extracted to enable correlating the device identifier with layer-3 network path information.

Device Monitoring

In some embodiments, a range of information is extracted from devices which can aid users in diagnosing application performance problems. Information can concern specific interfaces within the device or be general to the device itself. For example, this information can be classified into two categories: (1) metrics, which provide numerical indications of performance over a period of time; and (2) metadata, which provides contextual information about the device (e.g., shown as Metrics, Context data 106 in FIG. 1A).

Interface Metrics

In an example implementation, the primary metrics extracted from device interfaces are related to data rates. For example, the distribution of types of network packets (e.g., unicast/multicast/broadcast/unknown) can be tracked to understand the main consumers of network capacity in the network. In some cases, excessive non-unicast traffic ratios can indicate a misconfiguration.

The underlying cause of many application performance issues is packet loss, either caused by resource contention or errors in transmission. Accordingly, in some embodiments, for understanding resource contention, raw data rates and negotiated link capacities are tracked to understand capacity usage within each link. Also, to understand when packets are explicitly dropped by devices, statistics for packet drop rates are extracted, both for discards when a link is over capacity (e.g., along with associated queue contention metrics) and error rates for links with transmission problems.

In addition to extracting network performance metrics directly, information for the purpose of aiding diagnosis of network performance problems can also be extracted, including the connectivity state of the interface (e.g., offline/disabled and/or cable connectivity), as well as information on when this status last changed to detect sporadic failures. In some cases, information on link Maximum Transmission Unit (MTU) and duplex status can also be included to understand when these parameters may affect link throughput.

Device Metrics

From the device itself, metrics are extracted for tracking device availability (e.g., in the form of uptime) and performance statistics for the device itself, such as CPU and memory utilization over time.

Device Metadata

To provide context to the metrics collected from networks, metadata is gathered from the devices to determine how devices are connected to each other (e.g., the topology of the network computing environment), both physically and logically, and how network traffic flows between devices. To ensure the view of the device is kept up-to-date, the device identification data and interface metadata is periodically collected (e.g., every 5 minutes to 24 hours or some other periodic interval) as similarly described above.

In an example implementation, to determine the physical device topology, the neighbor lists are extracted from each device as determined by the link layer discovery protocols (e.g., LLDP and CDP, such as shown in FIG. 1A). These protocols allow devices to discover the identity of the devices connected to any of their ports. To understand specifically how these devices are connected, information on link-aggregations (e.g., Link Aggregation Group (LAG) and Port Channels) is extracted, which defines how physical links between devices are grouped into logical links. In addition, information on the logical layer-2 (L2) configuration of the network is extracted, which defines how traffic can flow between devices in the network. For example, VLAN information can be collected to define which ports are assigned to specific VLANs and spanning tree information to discover which ports are enabled for that VLAN. Further, IP addresses and layer-3 (L3) routing tables can be collected to determine interconnection between subnets and how other networks can be reached.

Monitoring Devices

Once devices have been discovered, by, for example, using the above-described process or other device discovery processes can be performed, a list of the discovered devices is presented to the user along with contextualizing information to aid the user in identifying devices, such as device type, vendor, and model, as well as the agent that discovered the device. In an example implementation, the user is provided an interface (e.g., a Graphical User Interface (GUI)) to search and filter the list of devices to select the specific devices of interest. The user may also choose to update the configuration data for any device, whether to select its specific monitoring address, agent, or credentials, and may also adjust the display name and type of the device.

For devices the user wishes to monitor, they can next select to monitor all or a specific subset of interfaces, either individual interfaces or a chosen type of interface. If a large number of devices are to be monitored, the user can additionally use a checkbox selector (e.g., or another interface element for efficiently configuring the devices to be monitored) to configure monitoring on multiple devices simultaneously in this example implementation.

For devices that are selected to be monitored, the agent is configured to execute a periodic scheduled task to extract, for example, some or all of the above-described metrics and metadata. For metrics that change regularly, the performance counters are sampled and both their current value in addition to the difference (or delta) between the current value and the value of the counter during the previous sampling window are monitored and provided/reported in this example implementation. The delta value is used to calculate the rate of change for that particular metric, which assists the user in understanding the relative performance of the device. Given that device counters may be stored in fields with limited numeric range, various heuristics can also be applied to understand when counters may have rolled over since the last sampling interval and correct for this deviation in the output data.

For metadata, which generally changes infrequently, the data is extracted and compared to the values that were received in the previous sampling window. In this example implementation, this comparison is used to emit only data that has changed for computing and network usage efficiency and performance, such as to limit processing, transmission, and storage overheads. Many datasets available on the device also supply an informational field with last-changed or serial-number semantics. This field indicates at what point in the past a specific subset of device data last changed, or represents a serial version number that indicates how many changes have been made to the data in question. Where these fields are available, these fields can first be queried to efficiently compare their values to those in the last sampling window. If these serial fields are unchanged, the data from the device for the current sampling window is not extracted, given that we know the data has not changed. This process also improves computing and network usage efficiency and performance, such as by reducing the number of queries sent to the device and limits the processing impact of such sampling on the device, in addition to reducing network load.

In this example implementation, device data sampling takes place over SNMP, a UDP-based protocol (e.g., as shown at 106 in FIG. 1A). Given that UDP is an unreliable transport protocol where queries may be lost in the network, the number of retries that can be sent for an individual query to a device is a configurable setting. Similarly, the timeout after which a query packet should be considered lost, such as in the case of slow-responding devices, is a configurable setting. In addition, smaller query sizes can be configured by the user (e.g., network/system admin), such as for networks with unreliable large-packet performance (e.g., as would be seen in networks with MTU mismatches), and also to request fewer data items in individual queries, to aid in compatibility with devices that do not strictly adhere to the SNMP protocol specification or are otherwise unreliable. The agent itself may also be configured to limit the aggregate data rate of queries that are emitted in order to avoid overloading individual devices or the network itself with large bursts of simultaneous queries, which may lead to large numbers of dropped query packets and redundant query retries.

Data that is collected from devices by the agent is then transmitted back to an Internet-based system for storage and processing (e.g., cloud-based service for facilitating application aware device monitoring using the disclosed techniques, such as shown in FIGS. 1A-1B as described above), or in the case of Internet connectivity issues, is cached locally until network connectivity is restored.

Alerting and Notifications

In some embodiments, various alerting and notifications are provided to facilitate application aware device monitoring using the disclosed techniques. For example, alerts for specific metric conditions, by specific interface or matching interface metadata for any device, are provided. As another example, notifications for device changes (e.g., new devices, interfaces), such as an online/offline device status change, are provided.

Providing Application Context to Device Metrics

In some embodiments, with device metrics and metadata collected in a centralized location, the collected device metrics and metadata information can be contextualized with network related data collected by other mechanisms. For example, collecting network related data (e.g., network layer information) from one or more agents utilizing a plurality of tests can be performed using commercially available solutions for measuring application performance (e.g., HTTP, Browser, and/or Voice application tests) from a global perspective (e.g., available from ThousandEyes, Inc. of San Francisco, Calif., and these and various other types of tests to facilitate cross-layer visibility and troubleshooting of application delivery associated with a distributed application(s) are discussed in greater detail below and as similarly disclosed in U.S. Pat. No. 10,230,603 entitled CROSS-LAYER TROUBLESHOOTING OF APPLICATION DELIVERY filed Mar. 15, 2013 and issued Mar. 12, 2019, which is incorporated herein by reference for all purposes), and these application-level metrics are combined with end-to-end active network testing for properties (e.g., latency, loss, and throughput) and protocol level information (e.g., BGP reachability and DNS performance).

As such, by providing contextual links between the application, protocol, and network layer, the user (e.g., network/system admin) can better understand the performance dependencies between applications and the underlying network and protocols, as will be further described below.

Device Context in Application Path Visualization

In some embodiments, end-to-end active network testing is performed to discover the layer-3 paths traversed by application traffic, which can help the user understand the general location at which network performance problems are occurring. For example, latency may be increasing between certain network locations or a specific hop in the path may be dropping packets. However, layer-3 measurements are generally only able to identify devices in the path by IP address and any associated hostname discoverable through reverse name resolution. Such approaches are limited in two ways. First, even if the device is within a network operated by the user/the user's enterprise/entity, configuration policies may lead to reverse DNS names that are not particularly meaningful to the user and may not provide adequate context to aid the user in identifying the specific device in question. Second, layer-3 hops typically represent routers that bridge multiple networks and, thus, will possess many separate IP addresses. It may not be clear from looking at several seemingly distinct paths that certain hops along each path belong to a single device. Failing to understand that such shared dependencies exist can lead to misdiagnosis when investigating application performance issues. As such, these two issues are addressed by contextualizing end-to-end path information using device data using the disclosed techniques for application aware device monitoring as will now be further described below.

Accordingly, in some embodiments, to aid in identifying which devices are operated by the user, and the specific identity of each device, the IP addresses discovered along the path can be matched with the IP addresses extracted from the devices. Matching to a specific device enables the visualized network path to be annotated with device information, using the more meaningful user-assigned name of the device instead of its reverse hostname and using the specific type of the device to visually distinguish it from devices outside of the user's/the associated enterprise's/entity's computing/network infrastructure. Additionally, which specific interface of the device is represented by the hop in question and additional interface metadata can be identified, such as interface type and any user-assigned name. By providing the identity of the devices and ports traversed by an end-to-end network path, the user (e.g., network/system admin) is able to more easily understand which precise components of their infrastructure may be impacting the end-to-end network performance and, thus, the application performance.

By matching the IP addresses in the network path to specific network devices, where shared dependencies exist between separate network paths can also be identified. As an example, where two or more paths traverse different IPs belonging to the same device, those individual network hops can be grouped into a single merged device-node when visualizing the path. This makes shared dependencies between separate paths readily apparent to the user (e.g., network/system admin) and aids the user in understanding how specific devices are represented in the network paths, as opposed to merely identifying IP addresses, reducing the potential for misdiagnosis of performance problems.

Identifying and visually highlighting devices within the user's own network also makes it more apparent when performance problems may be originating within the user's administrative domain. In an example implementation of a Graphical User Interface (GUI) for application aware device monitoring, by knowing the identity of the devices and interfaces traversed by a path, the user can link directly from a hop in the network path to the interface performance metrics that were collected from the device itself. Specifically, links can be provided directly to tables and timeline graphs of interface performance metrics, both for individual interfaces or aggregated by device or agent location. Such views enable users to see directly which devices are contributing to end-to-end performance issues. Where end-to-end throughput is limited or latency is unstable in a network path, links directly to the utilization of specific interfaces connecting devices can also be provided, comparing the known throughput of each port to the negotiated link capacity. What can be seen as packet loss in active network probing can be linked to specific interface metrics for packet discards and errors, thereby providing an effective root cause analysis for problems visible at the application layer using the disclosed techniques for application aware device monitoring.

Device Topology Visualization

Due to the design of the underlying network architecture, the techniques available in active network probing largely restrict visibility to layer-3 and above. Reasonably accurate layer-3 paths can be generated using the disclosed techniques, which facilitate identifying most layer-3 devices traversed along a path. However, from a local network perspective, most layer-3 devices are not directly interconnected and instead the network fabric is typically composed of layer-2 devices. Although layer-2 devices carry end-host traffic, they do not typically respond directly to end-host probes. As a result, this generally prevents their direct discovery and identification through active network measurement. In order to provide the user with visibility into the devices traversed in their networks at lower layers of the network stack (e.g., below layer-3), an alternative approach to exposing the structure of the underlying network based on device monitoring is performed in accordance with some embodiments.

For the purposes of aiding network configuration and diagnosis, many enterprise network devices support neighbor discovery protocols. Typically, devices will support one or both of the standardized LLDP or the proprietary CDP protocols. In these protocols, nodes periodically send specially addressed packets out of each of their connected ports containing information about the identity of the device and the specific port. Nodes also generally listen for these specific packets, but typically do not forward them to other devices. Nodes implementing these protocols therefore gain knowledge of their immediately connected neighbors.

In some embodiments, the disclosed techniques for application aware device monitoring include extracting such neighbor connectivity information from each device that is being monitored using the disclosed techniques (e.g., as similarly described above with respect to FIGS. 1A-1B). By collecting this information from a large number of devices, a physical network map can be generated one device at a time. Given that device identity standards are not consistent, a heuristic matching process can be performed to more effectively combine information from both CDP and LLDP protocols. In an example implementation, matching based on device names, addresses, and the addresses and identities of all the interfaces known to belong to devices in the network can be performed. In this example, the heuristic matching process attempts to detect address-like fields (e.g., MAC addresses embedded in device identities, or represented with different separators, IP addresses) and normalize these into canonical representations. The result of this heuristic matching process is a cohesive network map combining knowledge from different protocols and inconsistent device implementations. This cohesive network map specifies which port on each device is connected to each other device. Where remote devices or ports are not monitored or cannot be identified specifically, ephemeral identifiers can be generated that are consistent across the map, enabling partial topologies to be generated even for unmonitored devices. Such views generally do not form a complete view of a local network, because typically not all devices on the local network will be monitored, will support monitoring or the neighbor discovery protocol, or the extraction of such metadata by remote agents. Regardless, even a partially complete local network map can be valuable to the user in identifying how application traffic flows across their network as would be apparent to one of ordinary skill in the art.

Visualizing such physical network maps presents unique challenges compared to visualizing the structure of layer-3 end-to-end paths. With layer-3 paths generated by active probing, we are inherently provided with a structure defined by the path of the active probes; the path flows from source to destination and back again. With physical network maps derived from neighbor discovery protocols, we are afforded no such structural assistance. Nodes generally cannot identify their semantic role within the topology and it is not immediately clear what, if any, standardized topology pattern the network may have been designed around. As such, we utilize alternative approaches to generate network maps that are meaningful to the user.

In this example implementation, the graph is structured using the Floyd-Warshall algorithm to identify the shortest paths in the graph and from this to identify the likely edge and core nodes, with the intuition that network designs will generally aim to minimize hops through a core distribution layer of high-capacity devices. After identifying the roles of devices, algorithmic approaches can be performed to iteratively simplify the display of the graph by minimizing crossings and empty space, while attempting to regularize the layout by moving nodes into discrete positions on the horizontal and vertical axes. Where the graph layout cannot be automatically derived to the satisfaction of the user, various facilities (e.g., GUI and other interface mechanisms) are provided for the user to guide the layout algorithms by assigning devices into specific vertical tiers that map their own (mental) model of the network. For example, the user (e.g., network/system admin) can separate their network into a tier of network function devices (e.g., firewalls and load balancers), a routing tier for edge routers, and then separate switching tiers for the distribution core and access switches. These tier annotations guide the layout algorithm and enable display of complex network topologies in a way that is semantically meaningful. Accordingly, the user is more readily able to understand the role of each device and tier and how application traffic flows through the network.

Local network topologies, especially in data center environments, tend to have a large number of highly interconnected nodes. This presents particular challenges in visualization due to the large number of nodes creating performance bottlenecks in the layout and rendering algorithms (e.g., which typically do not scale linearly), and the inherent number of intersecting links making visual tracking difficult. We can make this task easier with the intuition that data center networks are generally regular and repetitive, for example, nodes are often deployed in redundant pairs. As such, in one embodiment, a preprocessing step can be performed in which we iteratively identify nodes that share connectivity (i.e., are linked to the same nodes), and then merge those nodes into a grouped node. This preprocessing operation effectively reduces redundant pairs to a single node and removes their respective links, and can significantly reduce the visual and computational complexity of regularly structured graphs such as data center networks. Grouped nodes can be expanded where the user is interested in the individual nodes, but such an approach otherwise aids the user in understanding the larger structure of complex networks without providing unnecessary detail.

Given such a local network topology map and the interface performance metrics collected for monitored ports, performance metrics of potential concern can be visually highlighted directly in the topology view. Users may tune highlighting parameters to show paths with high link utilization, discards, and/or error rates, providing a clear indication of precisely where problems are localized within a network, improving their ability to effectively and efficiently diagnose network performance problems.

In some embodiments, in addition to linking between the layer-3 hops represented in end-to-end application metrics and the interface performance metrics of the traversed infrastructure devices, we can also link those layer-3 hops to this local network topology map. For example, when linking from layer-3 hops to the device layer view, the individual devices and links directly involved in that end-to-end path can be automatically highlighted, providing the user with device context so that they can more effectively and efficiently understand the relationship between application performance and device performance.

Virtual Interfaces

In some embodiments, virtual interfaces are discovered and monitored including identifying the relationship between physical and virtual interface types, and their associated IP addresses. Discovering and monitoring virtual interfaces can further facilitate linkage between L3 (e.g., and hence application) performance and the connectivity and metrics of the underlying substrate.

In an example implementation, VLAN interfaces (e.g., Switched Virtual Interface (SVI), etc.) can be mapped to physical ports. Also, sub-interfaces can be mapped to ports. Visualizing the relationship between aggregate and underlay links (e.g., Link Aggregation Group (LAG), Port Channel (PC), and virtual Port Channel (PC)) can then be provided using the disclosed techniques.

Test Context in Device Topology Visualization

In some embodiments, overlaying visualization of an L3 path onto physical network topology is performed. For example, distinct link and node classes in the device topology can be provided to represent the L3 path traversed by an application/test. Also, the tests (applications) that traverse a given device can be identified.

Layer-2 Path Visualization

Active network measurements are generally limited in that they are only able to identify the layer-3 devices along the path and typically provide no visibility into the local network structure.

In some embodiments, layer-3 path visualization in physical topology is provided by combining routing tables (e.g., mapping prefixes to ports), VLAN-interface mappings (e.g., mapping device IPs to ports), and per-VLAN spanning trees (e.g., indicating paths traversed), and, in some cases, CAM/ARP tables (mapping ports to L2/3 nodes) to sketch the specific route a given application-level L3 path takes through the discovered physical network topology.

In some embodiments, layer-2 path visualization in an application level layer-3 path is provided by extracting the relevant components of the L3 path from the L2 graph and placing them between (e.g., device-device) or adjacent to (e.g., device-gateway) the L3 nodes in the application path visualization of the end-to-end test view.

Example Use Case Scenarios

Example use case scenarios will now be described that illustrate how the disclosed techniques for application aware device monitoring can improve the ability of a user (e.g., network/system administrator(s) (admin(s))) to more effectively and efficiently diagnose the underlying cause of application performance concerns to issues in specific network devices and ports.

Troubleshooting application and network issues is technically challenging even for experienced users as it is rarely clear where the root cause of the issue lies, and context-switching between multiple monitoring platforms adds to the confusion. Apply the above described techniques to provide access to the device layer and correlating the device layer to the network layer can allow users to more effectively and efficiently diagnose the underlying cause of application performance concerns to issues in specific network devices and ports. Specifically, the device layer provides visibility into an enterprise network's internal network devices by gathering network device topology, interface, and health metrics. On tests running through the enterprise network infrastructure, the device layer information can be provided to enhance the path visualization by correlating device context, such as with IP forwarding path, routing, and application-layer metrics. As such, an end-to-end visibility into application performance and richer network path metrics in a single pane of glass is provided as described herein with respect to various embodiments.

The disclosed techniques for application aware device monitoring facilitate end-to-end network visibility by applying insights from multiple layers of data to applications delivered across both internal networks and the Internet, which can be provided through a combination of active probing and real-time monitoring from distributed vantage points (e.g., using a combination of cloud-based application performance monitoring and commercially available agents, such as enterprise agents and device/endpoint agents, which are available from ThousandEyes, Inc. of San Francisco, Calif.).

In an example implementation, the enterprise agents monitor the availability and response times of privately hosted and cloud-based applications. Enterprise agents also correlate application metrics with network performance metrics and provide a hop-by-hop L3 path visualization from the source agent to the target application. The disclosed application aware device monitoring techniques that include monitoring at the device layer provide an additional layer of visibility into network device health so users can even more rapidly spot issues.

Traditional device monitoring solutions are generally siloed, focus solely on monitoring the health of the network device, and fail to provide contextual data on how device health could possibly affect application and service delivery performance. Enterprises have typically relied on additional tools to monitor their layer 1 and layer 2 network infrastructure(s) and match device data with the L3-L7 insights. As such, what is desired by enterprises/users is a single monitoring dashboard that proactively alerts on application and network issues before they turn into downtime or other application performance issues.

The disclosed application aware device monitoring techniques that include monitoring at the device layer help solve this problem, unifying insights from the application and network layers all the way down to network devices. With the correlated device layer and network layer information, users can troubleshoot issues and diagnose root causes, for example, in a single pane, ultimately decreasing Mean Time To Repair (MTTR) and facilitating a superior application experience for users (e.g., for Software as a Service (SaaS) and/or other network-based applications).

Apart from troubleshooting issues like interface congestion, faulty ports, and line cards, the disclosed application aware device monitoring techniques that include monitoring at the device layer can also help traffic engineering decisions by providing end-to-end visibility from the application all the way to the physical network topology.

The disclosed application aware device monitoring techniques that include monitoring at the device layer (e.g., Device Layer monitoring and correlation feature) can also help with housekeeping by tracking the inventory of network devices added to or removed from a user's network. As an example, the timeline functionality of the GUI can be used to go back and forth in time to understand the topology modifications and performance implications of these changes. As another example, multiple branch or data center locations can be monitored and viewed in a single dashboard of the GUI.

In the following example use case scenario, we have a simple branch network with an employee portal web server and a number of clients that are using it. We also have two ThousandEyes enterprise agents executing a download test that attempts to download a file from the web server and measure throughput and other network metrics in the background. One of the enterprise agents has the disclosed device layer monitoring and correlation feature enabled and collects interface metrics and device data from the monitored network devices.

In this example implementation, the enterprise agents perform periodic SNMP polling of IETF standard IF-MIB and CDP/LLDP MIB to collect the device metrics and topology information (e.g., every 5 minutes to 24 hours or some other periodic interval). The disclosed Device Layer feature utilizes the monitoring enterprise agents to have access to the SNMP management VLAN and SNMP read-only credentials (e.g., either SNMP v2c or SNMP v3 versions) of the network devices.

Initial configuration is essentially zero-touch, and the device discovery can be automated using scheduled discovery where the monitoring enterprise agent periodically scans a target host, IP address, or subnet range and discovers network devices to be monitored. Alternatively, the network devices can be added by specifying an IP address or hostname target using a manual discovery process. Users can then choose specific interfaces within the discovered devices to periodically collect health metrics and network device data.

SNMP is used as a data source in this example implementation as it is still the most widely used standard to gather network device metrics. However, the Device Layer feature can be implemented as open and extensible to support other data collection mechanisms (e.g., using existing or later developed open and/or proprietary protocols) to facilitate performing the disclosed techniques at the device layer.

In this example use case scenario, the download test is periodically triggering alerts, and we notice that availability drops and latency increases each time. So, we can now utilize the collected and correlated device layer and network layer information to attempt to determine why there is trouble accessing the employee portal.

Let's start by looking at the HTTP server performance metrics.

Figure 2:
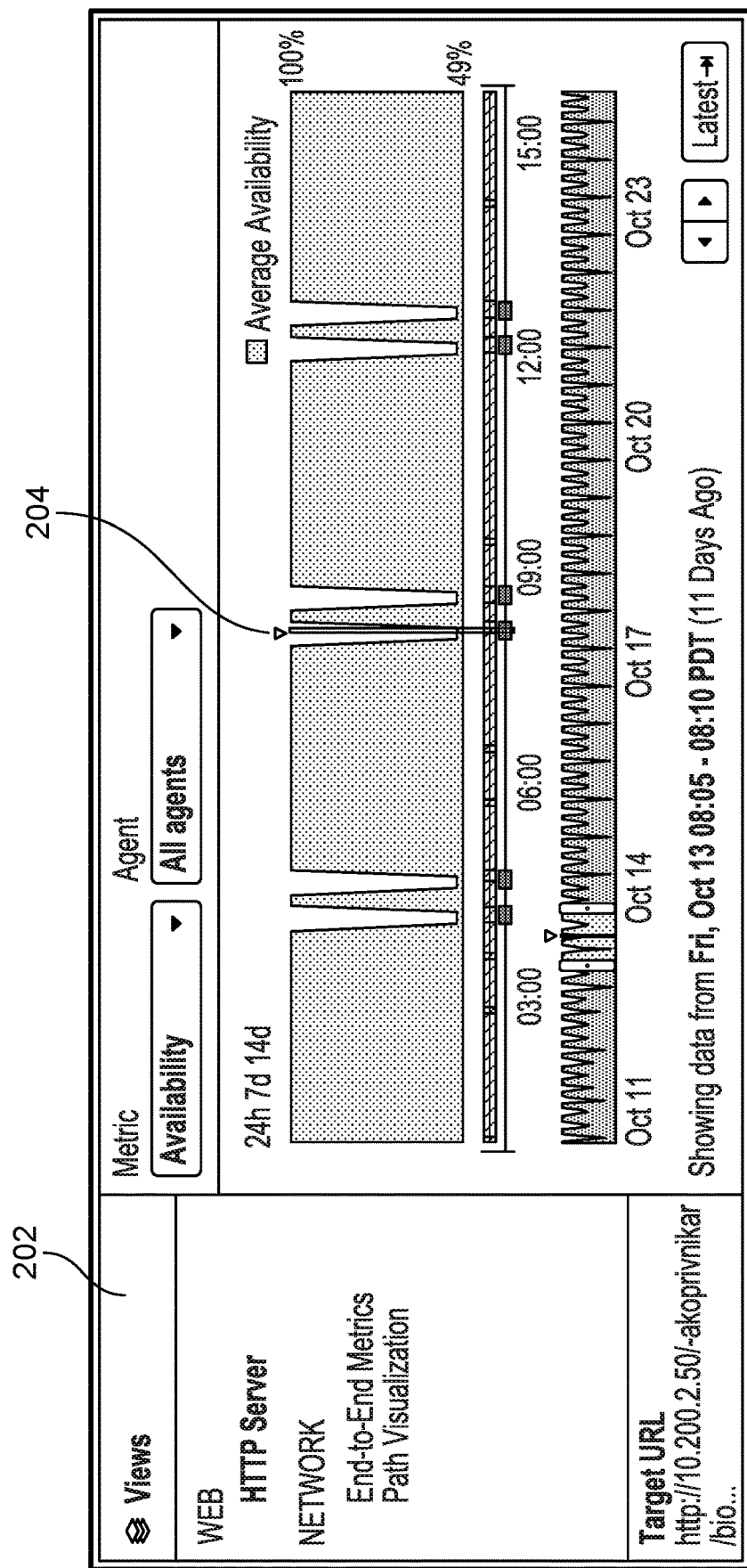
FIG. 2 illustrates an HTTP Server view in accordance with some embodiments.

FIG. 2 illustrates an HTTP Server view in accordance with some embodiments. Referring to FIG. 2, an HTTP Server view 202 shows a periodic drop in availability, such as shown at 204, indicating that something is wrong with the performance of the server.

At this point, we still have not determined if the problem is on the application or the network layer. Next, we can drill down into the Network View.

Figure 3:
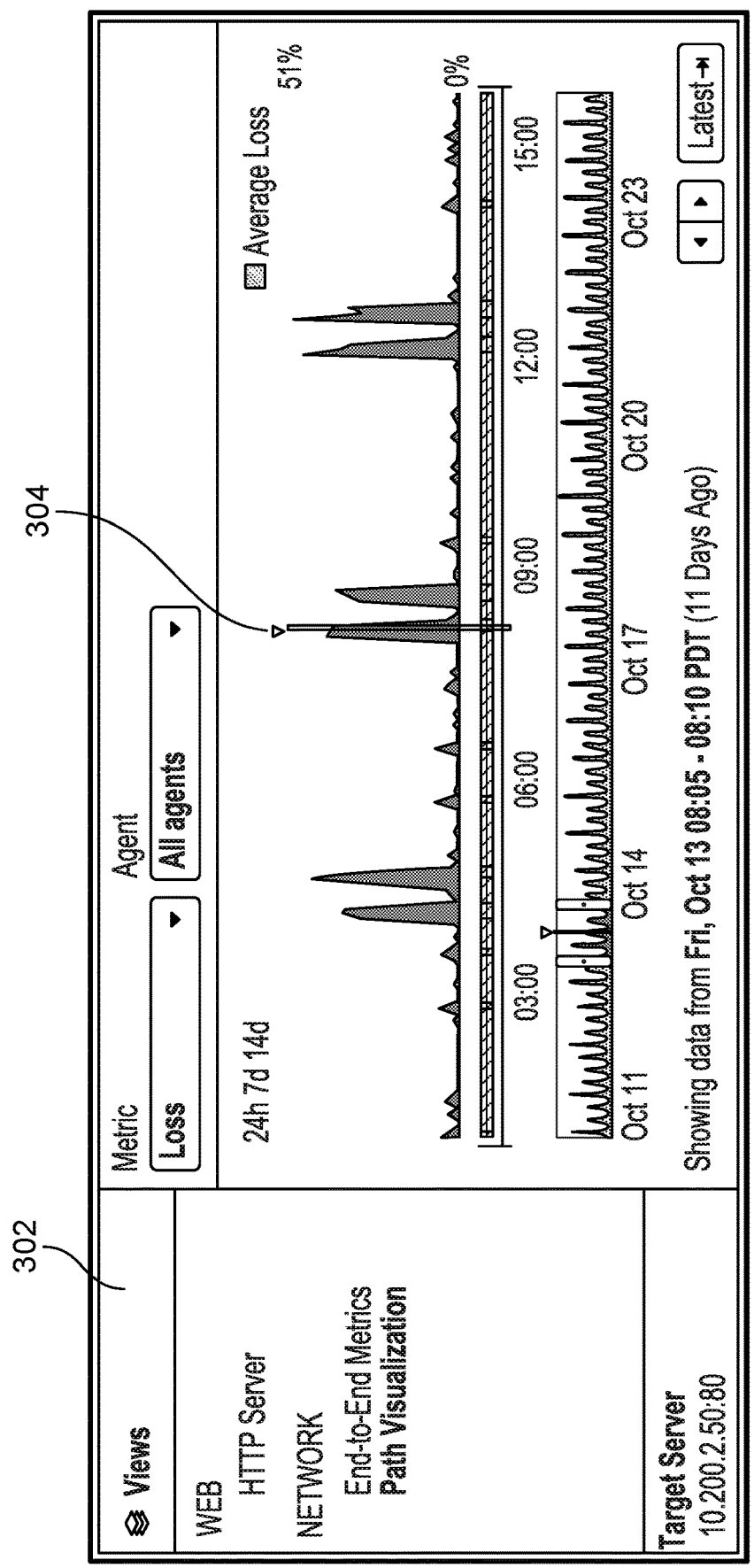
FIG. 3 illustrates a Network view in accordance with some embodiments.

FIG. 3 illustrates a Network view 302 in accordance with some embodiments. Referring to FIG. 3, an End-to-End Metrics timeline is provided to facilitate diving deeper into the network view. In the End-to-End Metrics timeline, the network quality problem (e.g., high loss/an increase in packet loss) directly correlates to the decrease in application availability, such as shown at 304. As such, this clearly indicates that the problem is on the network layer, but at this point, we still have not determined where and why this network layer problem is occurring on the network.

Figure 4:
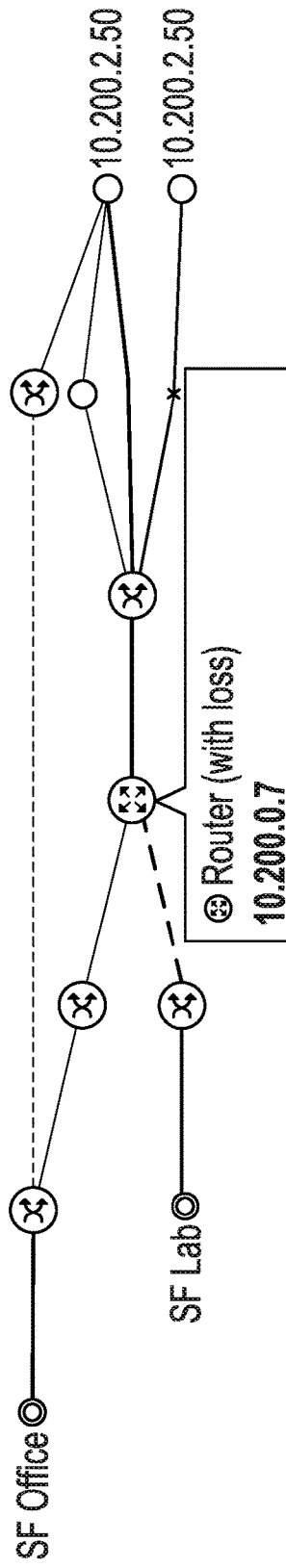
FIG. 4 illustrates a Path Visualization view in accordance with some embodiments.

FIG. 4 illustrates a Path Visualization view in accordance with some embodiments. To obtain more context on the network path traversed by the web portal traffic, we next drill down into a Path Visualization 402 as shown in FIG. 4. In the Path Visualization view, we can see that there is forwarding loss on the CSC router to the target server. This is where our analysis would generally end, but with the Device Layer feature enabled, we have additional data on these devices.

Clicking on the 'Show in device layer' link in the CSC router pop-up as shown at 404 of FIG. 4 allows the user to drill down to the Device Layer view with additional interface and device health metrics for the router in question.

Figure 5:
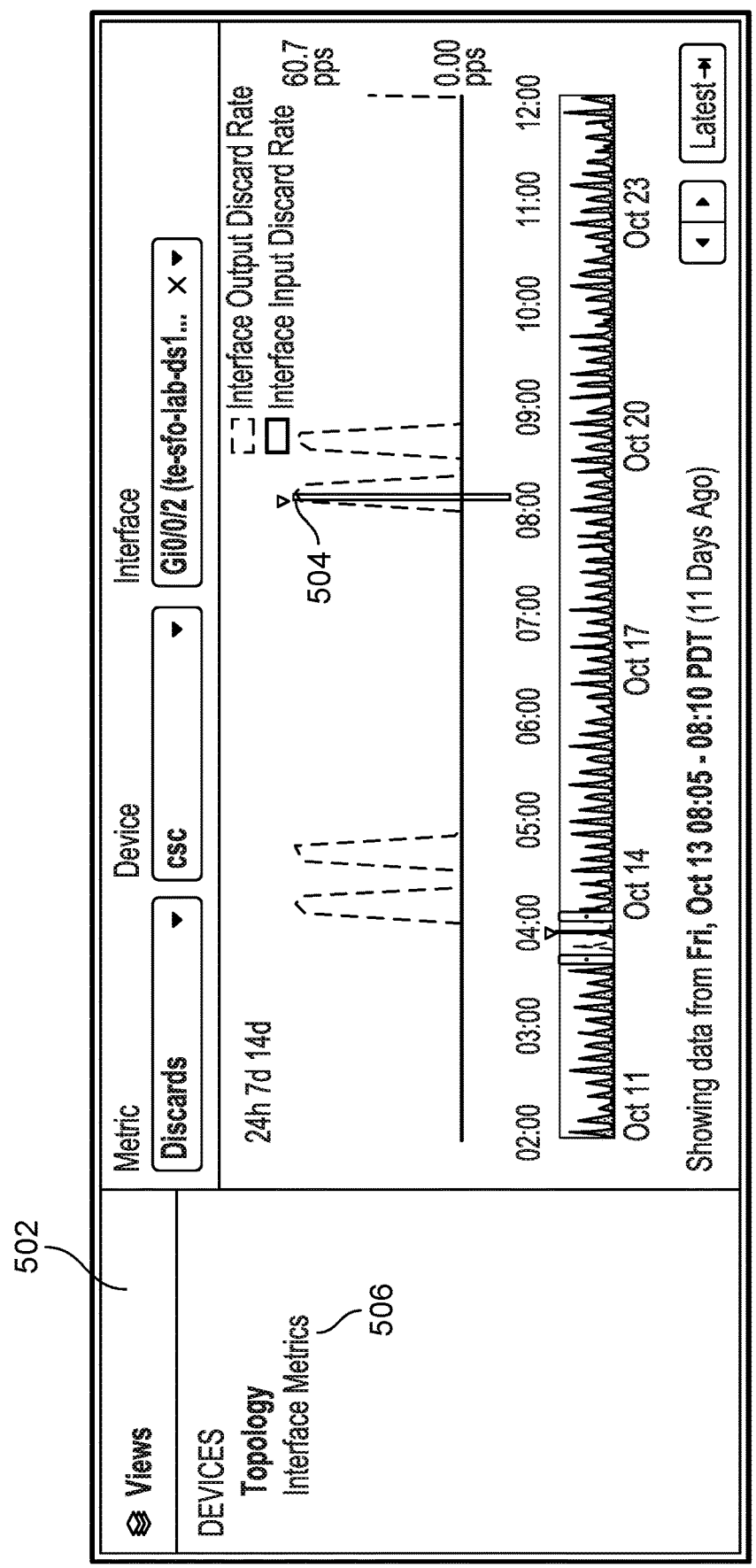
FIG. 5 illustrates a Device Layer view in accordance with some embodiments.

FIG. 5 illustrates a Device Layer view in accordance with some embodiments. From a Device Layer view 502 as shown in FIG. 5, a direct correlation between the spike in packet loss in the HTTP Server test and the spike in interface discards on the CSC router as shown at 504 is now clear as would be apparent to one of ordinary skill in the art.

Figure 6:
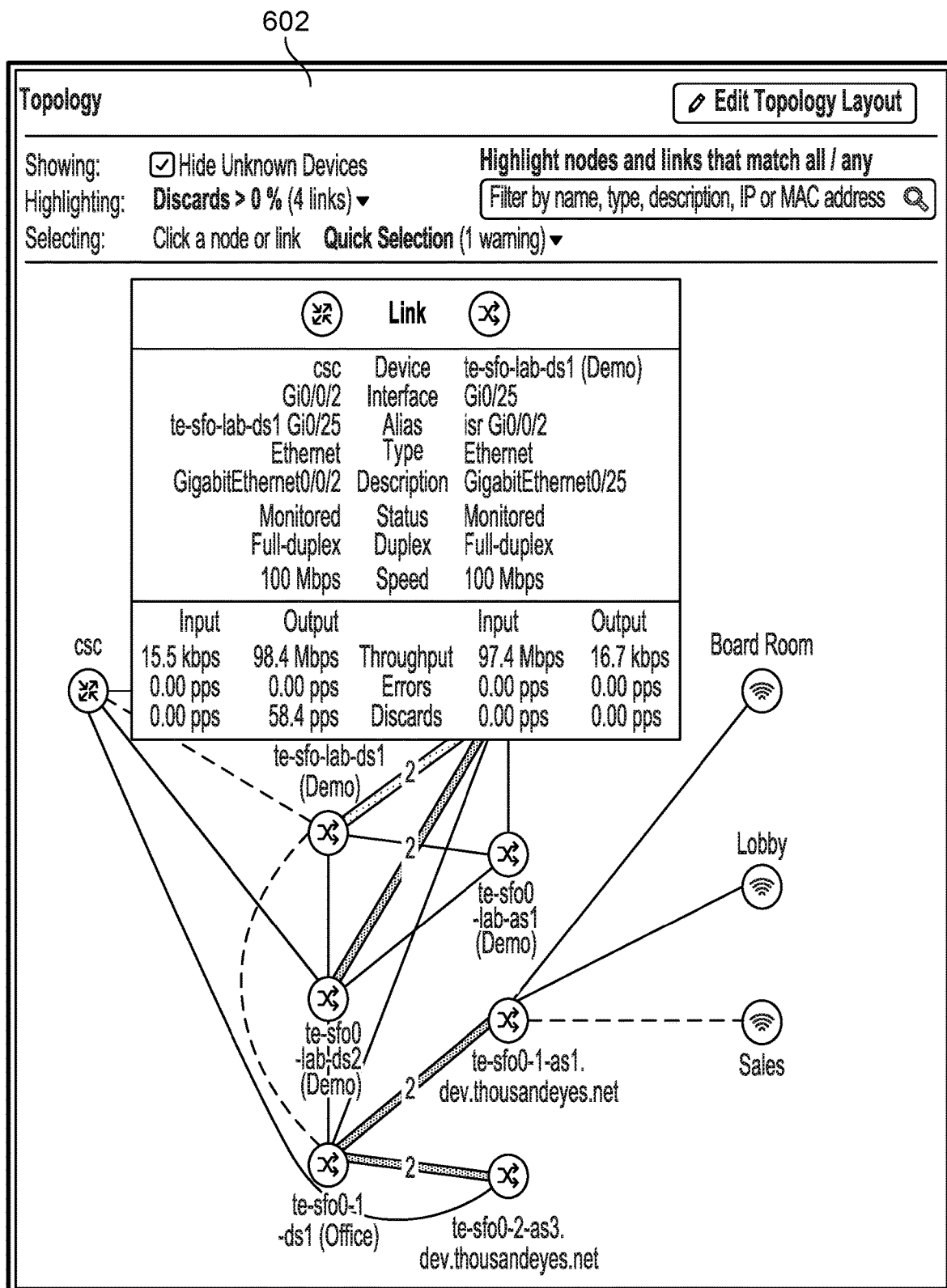
FIG. 6 illustrates a Topology view in accordance with some embodiments.

FIG. 6 illustrates a Topology view in accordance with some embodiments. From a Topology view 602 as shown in FIG. 6, with the Device Layer we can see the physical topology and interface parameters of Layer 2 and Layer 3 network devices, beyond the layer 3 devices that we previously saw in the Path Visualization view, as shown in FIG. 6.

In the topology shown in FIG. 6, the link between the CSC router and the te-sfo-1ab-ds1 switch is highlighted to indicate that discards are occurring on that link. In this example implementation of the GUI, hovering over the link provides more insights on the interface parameters. Though the devices are connected through Gigabit interfaces, we see that the link is configured to operate at a 100 Mbps speed, and the In/Out Throughput is just a little less than 100 Mbps as shown in FIG. 6.

To determine if there are other links on the CSC router that are experiencing discards or errors, let's jump into the Diagram tab under an Interface Metrics link 506 of FIG. 5.

FIG. 7 illustrates a Diagram view in accordance with some embodiments. A Diagram view 702 as shown in FIG. 7 illustrates that other than the discards on the output of interface Gi0/0/2 on the CSC router, there are no other interface issues. As such, the root cause of the periodic network loss and application availability issues in this example appears to be due to interface congestion on Gig 0/0/2 when traffic exceeds the configured speed of 100 Mbps.

Example processes for application aware device monitoring (e.g., including on enterprise IT networks) using the disclosed techniques will now be described below.

Processes for Application Aware Device Monitoring

Figure 8:
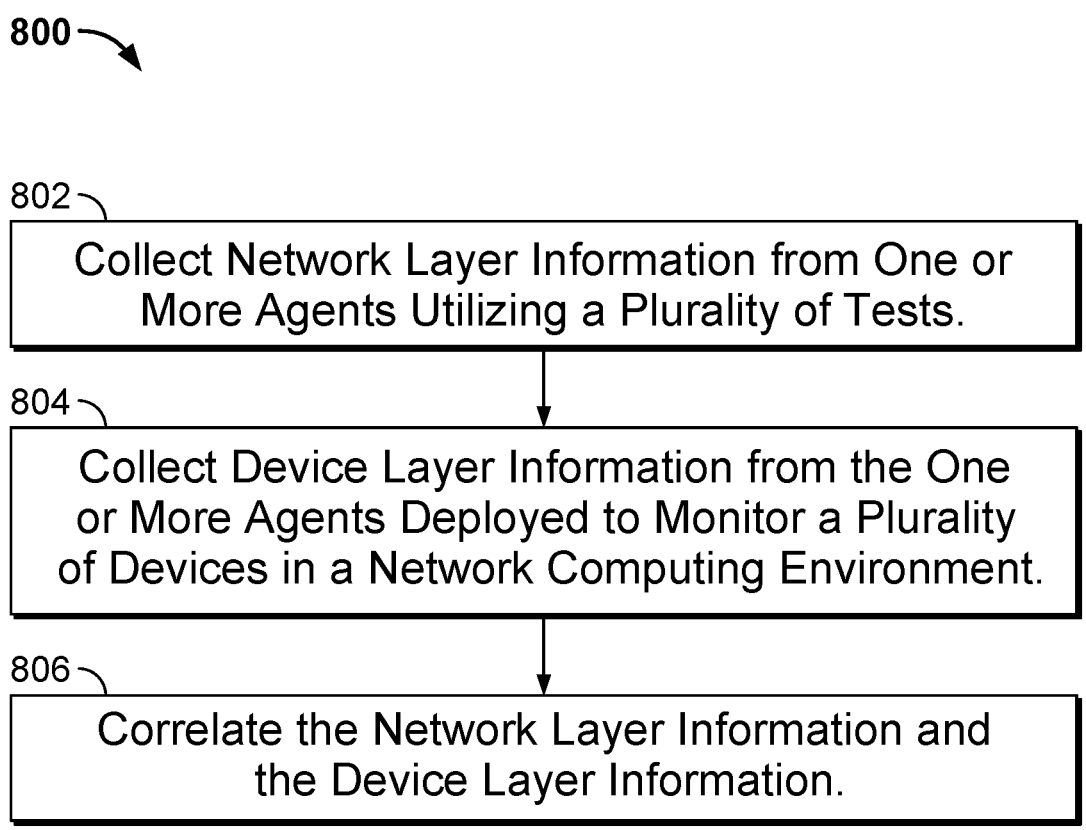
FIG. 8 illustrates a flow diagram for performing application aware device monitoring in accordance with some embodiments.

FIG. 8 illustrates a flow diagram for performing application aware device monitoring in accordance with some embodiments. In some embodiments, process 800 is performed using the architecture as shown in FIGS. 1A-1B and processing techniques as similarly described above.

At 802, collecting network layer information from one or more agents utilizing a plurality of tests is performed. For example, collecting network layer information from one or more agents utilizing a plurality of tests can be performed using commercially available solutions for measuring application performance (e.g., HTTP, Browser, Voice application tests, and/or various other network performance related tests) from a global perspective (e.g., available from ThousandEyes, Inc. of San Francisco, Calif., and these and various other types of tests to facilitate cross-layer visibility and troubleshooting of application delivery associated with a distributed application(s) are discussed in greater detail below and as similarly disclosed in U.S. Pat. No. 10,230,603 entitled CROSS-LAYER TROUBLESHOOTING OF APPLICATION DELIVERY filed Mar. 15, 2013 and issued Mar. 12, 2019, which is incorporated herein by reference for all purposes), and these application-level metrics are combined with end-to-end active network testing for properties (e.g., latency, loss, and throughput) and protocol level information (e.g., BGP reachability and DNS performance), such as similarly described above.

At 804, collecting device layer information from the one or more agents deployed to monitor a plurality of devices in a network computing environment is performed. For example, test results from each of the plurality of agents can be collected using the platform described above. As similarly described above, agents can provide user experience monitoring to facilitate diagnosis and troubleshooting of network performance and/or device related performance problems. Example devices that can be monitored using the disclosed techniques include, but are not limited to, router, switches, access points, firewalls, load balancers, and/or other network related device types, such as similarly described above.

In one embodiment, each of the plurality of agents performs network monitoring tests and system monitoring tests. For example, the enterprise agents and device/endpoint agents can perform network monitoring tests and system monitoring tests (e.g., including network device monitoring using an enterprise agent or enterprise agent cluster) as similarly described above.

In one embodiment, each of the plurality of agents is controlled by an agent controller. For example, the agent controller can facilitate deployment, configuration, and data collection operations with each of the plurality of enterprise agents as well as device/endpoint agents if applicable.

At 806, correlating the network layer information and the device layer information is performed. In some embodiments, the network layer information and the device layer information are correlated based on the test results and then output using the disclosed platform (e.g., generated by a web tier of the platform described above with respect to FIGS. 1A through 7). For example, monitored devices can be periodically queried to extract both interface performance metrics and contextual device and port information to enable correlating these performance metrics (e.g., interface performance metrics and contextual device and port information) with end-to-end application performance, such as similarly described above.

Example processes for application aware device monitoring correlation and visualization (e.g., including on enterprise IT networks) using the disclosed techniques will now be described below.

Processes for Application Aware Device Monitoring Correlation and Visualization

Figure 9:
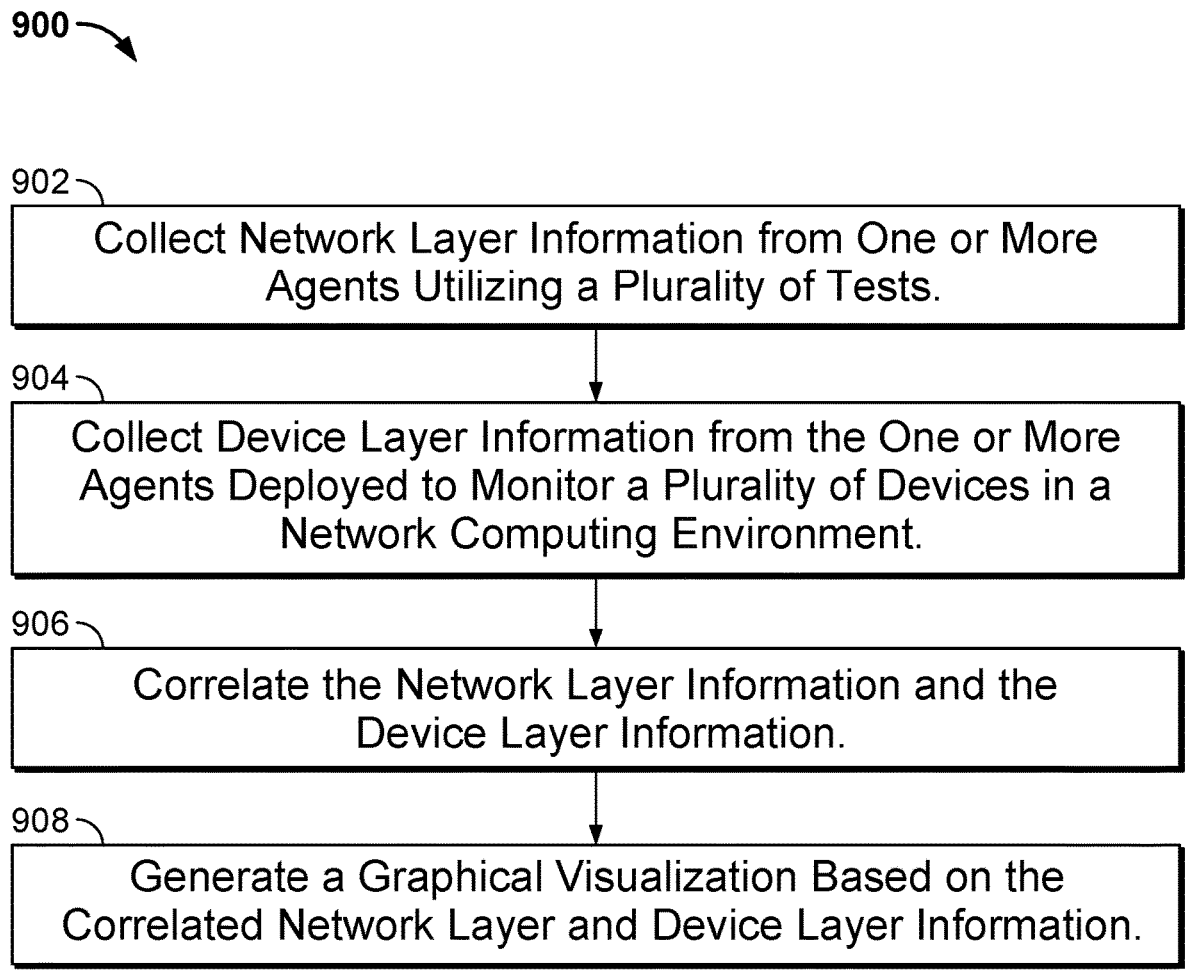
FIG. 9 illustrates a flow diagram for performing application aware device monitoring correlation and visualization in accordance with some embodiments.

FIG. 9 illustrates a flow diagram for performing application aware device monitoring correlation and visualization in accordance with some embodiments. In some embodiments, process 900 is performed using the architecture as shown in FIGS. 1A-1B and processing techniques as similarly described above.

At 902, collecting network layer information from one or more agents utilizing a plurality of tests is performed. For example, collecting network layer information from one or more agents utilizing a plurality of tests can be performed using commercially available solutions for measuring application performance (e.g., HTTP, Browser, Voice application tests, and/or various other network performance related tests) from a global perspective (e.g., available from ThousandEyes, Inc. of San Francisco, Calif., and these and various other types of tests to facilitate cross-layer visibility and troubleshooting of application delivery associated with a distributed application(s) are discussed in greater detail below and as similarly disclosed in U.S. Pat. No. 10,230,603 entitled CROSS-LAYER TROUBLESHOOTING OF APPLICATION DELIVERY filed Mar. 15, 2013 and issued Mar. 12, 2019, which is incorporated herein by reference for all purposes), and these application-level metrics are combined with end-to-end active network testing for properties (e.g., latency, loss, and throughput) and protocol level information (e.g., BGP reachability and DNS performance), such as similarly described above.

At 904, collecting device layer information from the one or more agents deployed to monitor a plurality of devices in a network computing environment is performed. For example, test results from each of the plurality of agents can be collected using the platform described above. As similarly described above, agents can provide user experience monitoring to facilitate diagnosis and troubleshooting of network performance and/or device related performance problems. Example devices that can be monitored using the disclosed techniques include, but are not limited to, router, switches, access points, firewalls, load balancers, and/or other network related device types, such as similarly described above.

In one embodiment, each of the plurality of agents performs network monitoring tests and system monitoring tests. For example, the enterprise agents and device/endpoint agents can perform network monitoring tests and system monitoring tests (e.g., including network device monitoring using an enterprise agent or enterprise agent cluster) as similarly described above.

In one embodiment, each of the plurality of agents is controlled by an agent controller. For example, the agent controller can facilitate deployment, configuration, and data collection operations with each of the plurality of enterprise agents as well as device/endpoint agents if applicable.

At 906, correlating the network layer information and the device layer information is performed. In some embodiments, the network layer information and the device layer information are correlated based on the test results and then output using the disclosed platform (e.g., generated by a web tier of the platform described above with respect to FIGS. 1A through 7). For example, monitored devices can be periodically queried to extract both interface performance metrics and contextual device and port information to enable correlating these performance metrics (e.g., interface performance metrics and contextual device and port information) with end-to-end application performance, such as similarly described above.

At 908, generating a graphical visualization based on the correlated network layer and device layer information is performed. For example, a graphical visualization of an application delivery state for one or more application delivery layers based on the test results can be generated and output using the disclosed platform (e.g., generated by a web tier of the platform described above).

In one embodiment, the graphical visualization of the application delivery state facilitates troubleshooting of network performance problems associated with one or more of the plurality of devices. Example graphical visualizations that can be generated include the GUI visualizations similarly described above (e.g., including example visualizations shown in FIGS. 2-7 as similarly described above) to provide access to the device layer and correlate the device layer to the network layer to facilitate a more effective and more efficient detection of the underlying/root cause of application performance concerns to issues in specific network devices and ports. Specifically, the device layer provides visibility into an enterprise network's internal network devices by gathering network device topology, interface, and health metrics. On tests running through the enterprise network infrastructure, the device layer information can be provided to enhance the path visualization by correlating device context, such as with IP forwarding path, routing, and application-layer metrics. As such, an end-to-end visibility into application performance and richer network path metrics in a single pane of glass is provided as described herein with respect to various embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by a device, network layer performance test results for a distributed application;
receiving, by the device, device layer performance test results for a plurality of devices in a particular computing environment, wherein the device layer performance test results includes device information for each of the plurality of devices;
identifying, by the device and based on the received network layer performance test results, a network path traversed by the distributed application across;
matching, by the device, a first device of the plurality of devices with an internet protocol (IP) address extracted from the device layer performance test results; and
correlating, by the device, the first device to a location along the network path based on the matching of the first device with the IP address.

2. The method as in claim 1, wherein the network layer performance test results are gathered by one or more agents configured to perform network monitoring tests and system monitoring tests.

3. The method as in claim 1, wherein the device layer performance test results are gathered by one or more agents configured to use Simple Network Management Protocol (SNMP).

4. The method as in claim 1, wherein the device information is selected from the group consisting of a user-assigned name and an interface type.

5. The method as in claim 1, wherein the first device comprises a device selected from the group consisting of a router, switch, access point, firewall, and a load balancer.

6. The method as in claim 1, further comprising:
causing, by the device, a graphical visualization of the network path to be displayed on a graphical user interface (GUI), wherein the first device is visually distinguished from other devices that are outside of the particular computing environment.

7. The method as in claim 1, further comprising:
causing, by the device, a graphical visualization of the network path to be displayed on a graphical user interface (GUI), wherein the first device is displayed along with a graphical representation of corresponding device information of the first device.

8. An apparatus, comprising:
one or more network interfaces to communicate with a distributed application of a computer network;
a processor coupled to the network interfaces and configured to execute one or more processes; and
an apparatus memory configured to store a process executable by the processor, the process when executed operable to:
receive network layer performance test results for a distributed application;
receive device layer performance test results for a plurality of devices in a particular computing environment, wherein the device layer performance test results includes device information for each of the plurality of devices;
identify, based on the received network layer performance test results, a network path traversed by the distributed application across;
match a first device of the plurality of devices with an internet protocol (IP) address extracted from the device layer performance test results; and
correlate the first device to a location along the network path based on the matching of the first device with the IP address.

9. The apparatus as in claim 8, wherein the network layer performance test results are gathered by one or more agents configured to perform network monitoring tests and system monitoring tests.

10. The apparatus as in claim 8, wherein the device layer performance test results are gathered by one or more agents configured to use Simple Network Management Protocol (SNMP).

11. The apparatus as in claim 8, wherein the device information is selected from the group consisting of a user-assigned name and an interface type.

12. The apparatus as in claim 8, wherein the first device comprises a device selected from the group consisting of a router, switch, access point, firewall, and a load balancer.

13. The apparatus as in claim 8, the process when executed further operable to:
cause a graphical visualization of the network path to be displayed on a graphical user interface (GUI), wherein the first device is visually distinguished from other devices that are outside of the particular computing environment.

14. The apparatus as in claim 8, the process when executed further operable to:
cause a graphical visualization of the network path to be displayed on a graphical user interface (GUI), wherein the first device is displayed along with a graphical representation of corresponding device information of the first device.

15. A tangible, non-transitory, computer-readable medium storing program instructions that cause a device in communication with a distributed application to execute a process comprising:
receiving, by a device, network layer performance test results for a distributed application;
receiving device layer performance test results for a plurality of devices in a particular computing environment, wherein the device layer performance test results includes device information for each of the plurality of devices;
identifying, based on the received network layer performance test results, a network path traversed by the distributed application across;
matching a first device of the plurality of devices with an internet protocol (IP) address extracted from the device layer performance test results; and
correlating the first device to a location along the network path based on the matching of the first device with the IP address.

16. The tangible, non-transitory, computer-readable medium as in claim 15, wherein the network layer performance test results are gathered by one or more agents configured to perform network monitoring tests and system monitoring tests.

17. The tangible, non-transitory, computer-readable medium as in claim 15, wherein the device layer performance test results are gathered by one or more agents configured to use Simple Network Management Protocol (SNMP).

18. The tangible, non-transitory, computer-readable medium as in claim 15 wherein the device information is selected from the group consisting of a user-assigned name and an interface type, further wherein the first device comprises a device selected from the group consisting of a router, switch, access point, firewall, and a load balancer.

19. The tangible, non-transitory, computer-readable medium as in claim 15, the process further comprising:
   causing a graphical visualization of the network path to be displayed on a graphical user interface (GUI), wherein the first device is visually distinguished from other devices that are outside of the particular computing environment.

20. The tangible, non-transitory, computer-readable medium as in claim 18, the process further comprising:
   causing a graphical visualization of the network path to be displayed on a graphical user interface (GUI), wherein the first device is displayed along with a graphical representation of corresponding device information of the first device.

* * * * *

UNITED STATES PATENT AND TRADEMARK OFFICE
CERTIFICATE OF CORRECTION

PATENT NO. : 11,509,552 B2
APPLICATION NO. : 17/066322
DATED : November 22, 2022
INVENTOR(S) : Thomas Haddow Page 1 of 1

It is certified that error appears in the above-identified patent and that said Letters Patent is hereby corrected as shown below:

In the Specification

Column 3, Line 43, please amend as shown:
available at https://www.ietf.org/rfc/rfc2233.txt) and Cisco Signed and Sealed this
Seventh Day of March, 2023

Katherine Kelly Vidal
*Director of the United States Patent and Trademark Office*